April 24, 1962 L. ROSEN ET AL 3,031,651

MAGNETIC RECORDING APPARATUS

Filed May 22, 1958

United States Patent Office 3,031,651 Patented Apr. 24, 1962

3,031,651
MAGNETIC RECORDING APPARATUS

Leo Rosen, Framingham, and John L. Rothery, Concord, Mass., assignors, by mesne assignments, to Arthur D. Little, Inc., Cambridge, Mass., a corporation of Massachusetts Filed May 22, 1958, Ser. No. 737,116
13 Claims. (Cl. 340—174.1)

This invention relates to magnetic recording apparatus of the general class including magnetic recording tape and wire or magnetic drums and discs, and particularly to magnetic memory or data storage devices.

A problem in magnetic storage or computer data arises from the need for large capacity and short random access time. For example magnetic tapes have extremely large storage capacity but long access time. Magnetic drums have relatively shorter access time but at the expense of capacity. It has been proposed to use arrays of magnetic tapes or wires, but such arrays present mechanical scanning difficulties, and pulse-type data recorded thereon suffer from lack of definition and poor reproduction.

Accordingly, it is an object of this invention to provide a novel magnetic storage device and apparatus which has a relatively large storage capacity and short access time, and which sharply records and reproduces pulse and other types of data. A further object is to provide a magnetic storage means which is readily detachable from a scanning device as a unit, and yet may be scanned with precision.

According to the invention magnetic record means comprises a solid, rigid body forming an elongate cylindrical surface of highly permeable magnetic material having a magnetic record on said surface. There may be an external layer of magnetic material on the body or the external surface of a body wholly of magnetic material. By a cylindrical surface is meant the external surface of a rod-like member or the internal surface of a passage. The surface may embrace an elongate volume of circular or polygonal cross-section. Preferably the magnetic record is ring-shaped, that is in the form of a closed polygonal or circular loop.

Further according to the invention the aforesaid record means is combined with a magnetic transducer moved relatively to said body and having a surface closely fitting the aforesaid cylindrical surface so that the transducer is guided in predetermined relation to said cylindrical surface.

For the purpose of illustration typical embodiments of the invention are shown in the accompanying drawings in which.

Figures 1, 2, 3, 4, 5, 6, 7, 8, 9, 10, 11:
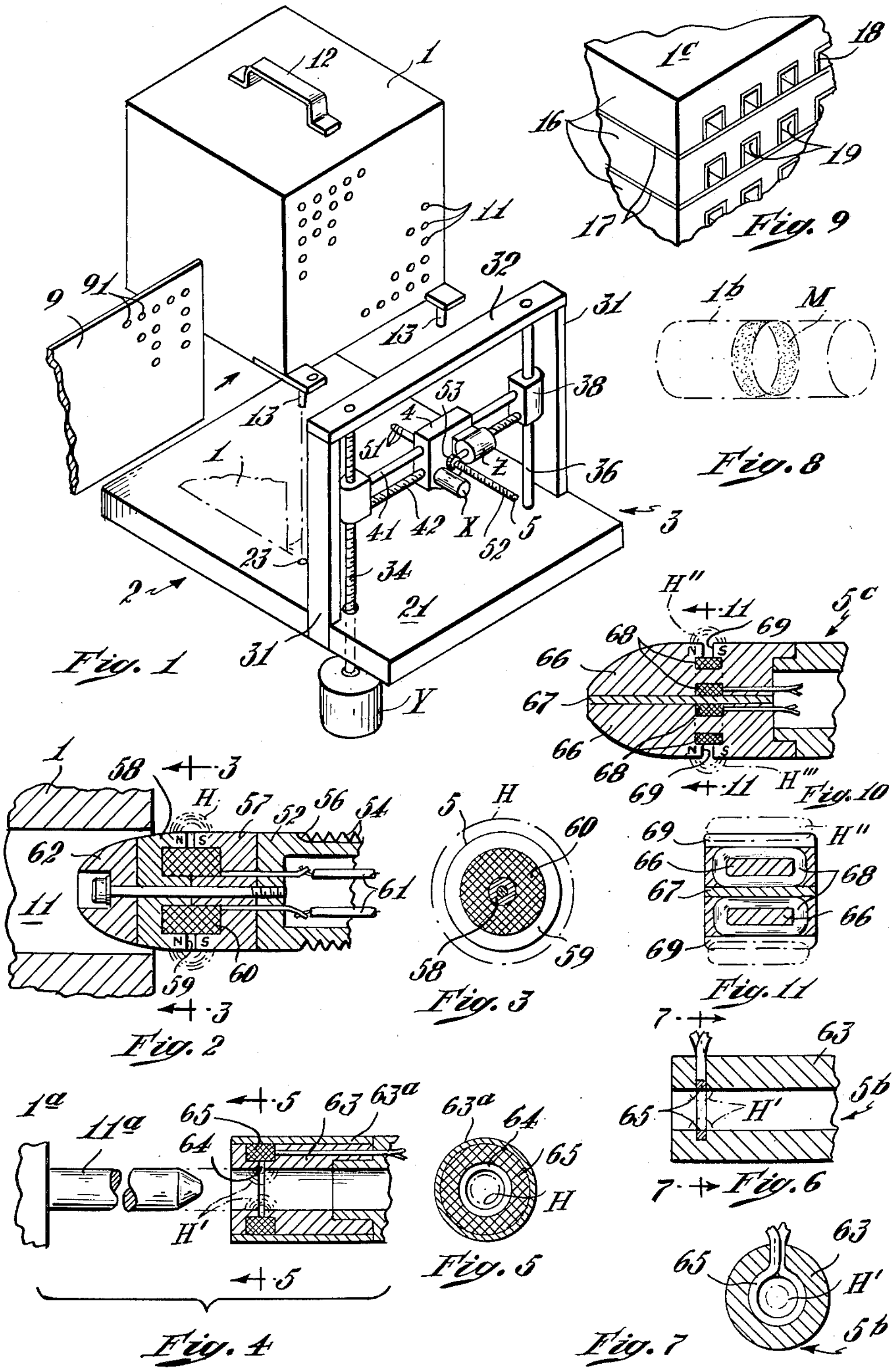
FIG. 1 is an isometric view of magnetic storage means and scanning apparatus.
FIG. 2 is an enlarged fragmentary vertical section of the storage means and transducer in the apparatus of FIG. 1.
FIG. 3 is a section on line 3—3 of FIG. 2.
FIG. 4 is an enlarged fragmentary view, partly in vertical section, of another form of magnetic storage device and transducer.
FIG. 5 is a section on line 5—5 of FIG. 4.
FIGS. 6 and 7 are views, like FIGS. 4 and 5 respectively, of still another form of storage device and transducer.
FIG. 8 shows schematically a form of magnetic record in the storage means shown in FIGS. 1 to 4.
FIG. 9 is a fragmentary view of a further form of magnetic storage means.
FIG. 10 is a vertical section of a further form of transducer.
FIG. 11 is a section on line 11—11 of FIG. 10.

As shown in FIG. 1 a memory and scanning device comprises a magnetic memory or storage unit 1, a frame 2 including a base 21, an upright member 31 and a bearing bridge 32 supporting a scanning mechanism 3. The storage unit 1 is formed by a solid rectangular block of material having a plurality of parallel cylindrical passages 11 extending from one face of the block into the block. The memory 1 is a separable unit carried by a handle 12 which can be located precisely on the base 21 by the interfitting of register pins 13 on the unit 1 and register holes 23 in the base 21. The unit may be formed wholly of a magnetic material such as polyethylene plastic mixed with iron oxide, or it may be formed of a non-magnetic material such as brass or plastic whose cylindrical openings 11 are coated with a magnetic recording substance such as iron oxide. In either case the passages 11 have a surface of magnetizable material.

The individual passages are adapted to receive magnetic marks along their length, which marks may be recorded, scanned or erased by a probe 5 comprising a threaded shaft 52 carrying at one end a head having one or more transducers 51. The transducer head may have a recording, reading or erasing transducer or a combination thereof as more fully explained hereinafter. The probe is indexed in two dimensions to locate the head opposite a selected passage 11 and is then driven in and out of the passage in a third dimension by the scanning mechanism 3.

The passages 11 are shown arranged in a rectangular pattern entering on one side of the unit 1 but may be arranged in a polar coordinate, or other, pattern with suitable modification of the scanning mechanism. Also the passages may enter from two opposite faces of the storage unit so as to be scanned simultaneously by two or more scanning mechanisms.

The probe 5 is movably supported on a carriage 4 which is driven in a horizontal direction by a servo motor X having a gear (not shown) engaging a threaded shaft 42. The carriage rides on a support shaft 41, both the support and threaded shaft being in turn supported on blocks 37 and 38. One block 38 slides on a vertical shaft 36 secured at one end to the base 21 and at the other end to the horizontal member 32. The other block 37 is carried on a worm 34 journaled at its upper end in the horizontal member 32 and adapted to be driven by a servo motor Y to raise and lower the blocks 37 and 38 and carriage 4. A third servo motor Z mounted on the carriage 4 drives the probe in a third dimension. The servo motor Z is geared to a ring gear 53 rotatably attached to the carriage 4 and engaging threads 54 on the probe 52. As shown in FIG. 2, a keyway 56 on the probe 5 prevents rotation of the probe, although it is possible to drive the probe with both a rectilinear and a rotational motion so that the head 51 describes a helical path into and out of the passages 11.

A particular passage may be selected by feeding appropriate control signals to the servo motors X and Y. A further signal fed to the motor Z will then drive the probe into the selected passage.

As shown in FIG. 2 the head carried at the end of the probe 5 comprises one or more electromagnetic devices 51 each including a ferromagnetic core formed by two pieces 57 and 58 which define an annular air gap 59 bounded by poles N and S. Wound on the core 57, 58 is a coil 60 having leads 61 extending through the threaded portion of the probe 52. The coil 60 forms a closed loop which produces in and adjacent the air gap a ring-shaped magnetic field H when current is applied to the leads 61. Of course if the transducer device is used to detect a magnetized area in one of the passages the field H will represent a ring-shaped zone to which the transducer is responsive.

If the transducer 51 is to be used for recording it will, when a pulse of current is applied to the coil 60, mark a magnetic record M on the magnetizable surface of one of the passages 11. Such a magnetic mark is shown schematically in the phantom view of FIG. 9 wherein the cylindrical surface 1*b* may be that of a passage within a unit or that of a rod. In either case an invisible magnetic record unit M is located in a ring-shaped zone completely embracing the cylindrical surface 1*b*.

This type of transducer and recording surface offers a marked advantage in definition over previous types of magnetic recording apparatus in that the transducer field H is in the form of a closed loop having no ends in which field strength may taper off. In contrast, magnetic records transversely of a magnetic tape are weaker and diffused or fringed at their ends than in their mid parts with the consequence that electrical pulses, for instance square waves, are not clearly defined on the surface of the medium and in reproduction lack the desired rectangular or other definite form and tend to be distorted. For example a square wave input is reproduced more like a sine wave representing a gradual increase and decrease of current rather than the desired On-Off form. Because the present magnetic transducing field H and record M do not suffer from such weakening and diffusion at their ends, they are of uniform width throughout their circumference and faithfully represent the electrical input.

A further feature of the invention resides in the guiding or supporting of the probe 5 by the passage 11. While the passages 11 are preferably rectilinear and parallel the probe may be made somewhat flexible because its tapered forward end 62 need not be precisely aligned with any one of the apertures 11. When the probe is driven into the aperture the tapered end 62 automatically centers the probe in the aperture during entry and thereafter the probe, and particularly the recording head, closely fits the passage so that the entire periphery of the air gap 59 is substantially in contact with the wall or surface of the passage 11.

Instead of forming the cylindrical recording surface as the inner wall of a passage, the surface may be formed as the exterior periphery of the rod 11*a* on a support 1*a*. Such a rod may be formed of magnetic material or have a layer of recording substance on its exterior. The probe for writing or reading the record on such a cylindrical surface may be in sleeve form as shown in FIGS. 4 and 5. A sleeve-type probe has an annular shaped core 63 forming an internal air gap 64 surrounded by a coil 65 and a magnetic sleeve 63*a* which completes a magnetic path between opposite poles at the air gap. Again the magnetic field H′ which is produced, sensed or erased by the coil is ring-shaped, that is in the form of a closed loop, in this case the field being within the core 63.

A similar probe for writing, reading or erasing the record on an external cylindrical surface is in the form shown in FIGS. 6 and 7. The probe 5*b* has a sleeve 63 which may be of either magnetic or non-magnetic material. A single turn coil 65 is cemented or otherwise secured in an annular groove in the inner wall of the sleeve 63. The overlapping ends of the loop which are insulated from each other complete a loop capable of forming a closed-loop field extending entirely around the annular groove of the sleeve. A magnetic mark made or sensed by such a field avoids the end taper or fringe effect which has heretofore handicapped the single conductor type of transducer.

As previously suggested, the passages need not be circular in cross-section but may be rectangular as shown in FIG. 9, or of any other polygonal cross-section. In FIG. 9 a different form of storage unit 1*c* comprises a stack of plates 16 having rectangular grooves 19 in one face thereof. One side of the plate is coated with a magnetic recording substance and the groove 19 is coated with a similar recording substance 18. The several plates 16 are joined or held together by cement or the like to form a detachable unit. As in the embodiments of FIGS. 1 to 3 the passages 19 form an elongate cylindrical surface of magnetic material in which a ring-shaped magnetic record may be marked to embrace the cylindrical surface. Or if desired, each of the flat faces forming the cylindrical passage 19 may receive one or more separate series of magnetic records, the separate records being applied, for example, by a rectangular probe 5*c* shown in FIGS. 10 and 11.

It will be understood that the transducers described so far may be used for writing information on the cylindrical surface upon the application of current to the coil, for erasing such information by application of a suitable alternating current, or for detecting the magnetically recorded information whether in pulse or continuously modulated form. Accordingly, two or more such transducers may be placed on the same head. As shown in FIG. 1 three transducers 51 are located on the head, one each for reading, writing and erasing. For example, the transducer nearest the end of the probe may be an erasing device, the next a writing device and the third a reading device so that as the head is moved into a passage it first erases information previously stored there, then writes new information and concomitantly reads back the newly written information for checking or comparison purposes. Both the inward and outward strokes of the probe may be used for writing, reading and erasing.

A plurality of transducers may be located on one head for the purpose of writing two or more records concomitantly. As shown in FIGS. 10 and 11 a rectangular cross-section head 5*c* suitable for use with the rectangular passages 19 of FIG. 9 carries two cores 66 separated by a paramagnetic layer 67 and forming two independent air gaps 69 on opposite sides of the rectangular head. Each core has a coil 68 producing, or sensitive to, an independent field H″ or H‴. Such a probe may write two series of recording marks on opposite walls of the rectangular passage 19. It is apparent that as many transducers may be located on the probe head as the polygonal passage 19 has faces to receive separate records.

With further reference to FIG. 1 it can be seen that the present apparatus is particularly well adapted to a form of punch card control. A perforated card or other rigid sheet 9 having openings 91 spaced in the same relation to each other as the openings 11 of the storage unit 1 may, for the purpose of obstructing or exposing one or more of the passages, be fitted or located over the face of the unit 1 into which the perforate passages 11 enter. The punch card 9 will thus further control the selection of passages 11 to be scanned by the mechanism 3. For example if the servo motor Z is provided with a slip clutch in its horizontal drive of the probe 5, and if the punch card is imperforate at positions corresponding to certain passages 11, then those passages cannot be scanned although the control signals fed to the X and Y servo motors locate the probe 5 opposite such passages.

From the foregoing description it is seen that the present invention provides a storage unit which is of large capacity and which may be readily removed and replaced by another unit. While the frame accurately locates the detachable unit with respect to the scanning mechanism, the structure of the probe is such that slight misalignment is corrected by guiding of the tapered probe head into the passages of the unit.

A single series of marks of greatly improved definition may be marked in the unit, or a plurality of records can be marked in passages of various cross-sections. Several servo scanning mechanisms are available which will rapidly gain access to any one of the passages and quickly read the information stored therein. Positioning errors are not cumulative because of the automatic adjustment by the guiding of the probe into the passages. A memory unit whose frontal area is 100 square inches can receive 100 passages per square inch or a total of 10,000 passages, each 10 inches deep. Approximately 100 bits of information may be stored per inch of passage and hence as many as 10,000,000 bits may be stored in a 10 inch cube storage unit. Storage capacity increases as the square of the increase in width of any one side. However, the time for access to one passage varies little from that for access to any other passage. Further the access time increases only proportionally to the increase in the width of the side, while the capacity has increased as the square of the width.

It will thus be understood that the present disclosure is for the purpose of illustration only and that this invention includes all modifications and equivalents which fall within the scope of the appended claims.

We claim:

1. A magnetic record storage device for receiving a magnetic transducer, said device comprising a plurality of parallel passages internal of a solid body and extending inwardly from at least one face of said body, the surface of each of said passages defining a continuous surface of a highly permeable and retentive magnetic material suitable for receiving a magnetic record thereon, each of said passages being shaped to hold a transducer in contact with said surface so as to restrict the lateral movement of said transducer with respect to said surface.

2. A magnetic record storage device in accordance with claim 1, wherein said passages have polygonal cross sections.

3. A magnetic record storage device in accordance with claim 2, wherein said passages have rectangular cross sections.

4. A magnetic record storage device in accordance with claim 1, wherein said passages have circular cross sections.

5. A magnetic record storage device for receiving a transducer comprising a solid body including a plurality of integrally joined plates, each of said plates having a grooved face and another face and being positioned such that the grooved face of each plate abuts another face of an adjacent plate, whereby said plates define within said body a plurality of parallel passages internal of and extending inwardly from at least one surface of said rigid body, the surface of each of said passages defining a continuous surface of a highly permeable and retentive magnetic material suitable for receiving a magnetic record thereon, each of said passages being shaped to hold a transducer in contact with said surface so as to restrict the lateral movement of said transducer with respect to said surface.

6. A magnetic record storage device in accordance with claim 5, wherein said plates are formed of a magnetic material.

7. A magnetic record storage device in accordance with claim 5, wherein said magnetic material is a plastic containing a magnetic pigment.

8. A magnetic record storage device in accordance with claim 5, wherein the surfaces of at least said grooves and of said flat face are coated with a magnetic material.

9. Magnetic recording apparatus, comprising transducer means; an interchangeable solid body removably mounted in the recording apparatus and having a plurality of parallel passages internal thereof extending inwardly from at least one face, the surface of each of said passages defining a continuous surface of a highly permeable and retentive magnetic material suitable for receiving a magnetic record thereon, each said passage being shaped to hold said transducer means in contact with said surface so as to restrict the lateral movement of said transducer means with respect to said surface; locating means for producing relative movement between said transducer means and said body whereby said transducer means may be inserted into a selected one of said passages; moving means for imparting axial motion to said transducer means within said parallel passages; and support means adapted for mounting said interchangeable solid body, said locating means and said moving means.

10. Magnetic recording apparatus in accordance with claim 9 further characterized in that said transducer means is mounted on a flexible probe.

11. Magnetic recording apparatus in accordance with claim 9 wherein said transducer means comprises a plurality of heads.

12. Magnetic recording apparatus, comprising transducer means; an interchangeable solid body removably mounted in the recording apparatus and having a plurality of parallel passages internal thereof extending inwardly from at least one face, the surface of each of said passages defining a continuous surface of a highly permeable and retentive magnetic material suitable for receiving a magnetic record thereon, each said passage being shaped to hold said transducer means in contact with said surface so as to restrict the lateral movement of said transducer means with respect to said surface; locating means for producing relative movement between said transducer means and said body whereby said transducer means may be inserted into a selected one of said passages; moving means for imparting lengthwise and rotational motion to said transducer means within said parallel passages; and support means adapted for mounting said interchangeable solid body, said locating means and said moving means.

13. Magnetic recording apparatus, comprising transducer means; and interchangeable solid body adapted for easy replacement in the recording apparatus and having a plurality of parallel passages internal thereof extending inwardly from two opposite faces, the surface of each of said passages defining a continuous surface of a highly permeable and retentive magnetic material suitable for receiving a magnetic record thereon, each said passage being shaped to hold said transducer means in contact with said surface so as to restrict the lateral movement of said transducer means with respect to said surface; locating means for producing relative movement between said transducer means and said body whereby said transducer means may be inserted into selected ones of said passages from both of said faces; moving means for imparting axial motion to said transducer means within said parallel passages; and support means adapted for mounting said interchangeable solid body, said locating means and said moving means.

References Cited in the file of this patent

UNITED STATES PATENTS

| | | |
|---|---|---|
| 2,080,100 | Tauschek | May 11, 1937 |
| 2,229,293 | Huntley et al. | Jan. 21, 1941 |
| 2,351,003 | Camras et al. | June 13, 1944 |
| 2,416,279 | Begun | Feb. 25, 1947 |
| 2,462,435 | Stanton | Feb. 22, 1949 |
| 2,650,830 | Potter | Sept. 1, 1953 |
| 2,719,965 | Person | Oct. 4, 1955 |
| 2,751,274 | Andrews | June 19, 1956 |
| 2,769,873 | Noregaard | Nov. 6, 1956 |
| 2,770,797 | Hamilton et al. | Nov. 13, 1956 |
| 2,842,754 | Luhn | July 8, 1958 |
| 2,902,678 | Kosonocky | Sept. 1, 1959 |
| 2,907,988 | Duinker | Oct. 6, 1959 |
| 2,918,656 | Nolde et al. | Dec. 22, 1959 |